No. 894,037.
PATENTED JULY 21, 1908.
J. J. McCOURT.
STOCK WATERER.
APPLICATION FILED APR. 15, 1907.
2 SHEETS—SHEET 2.
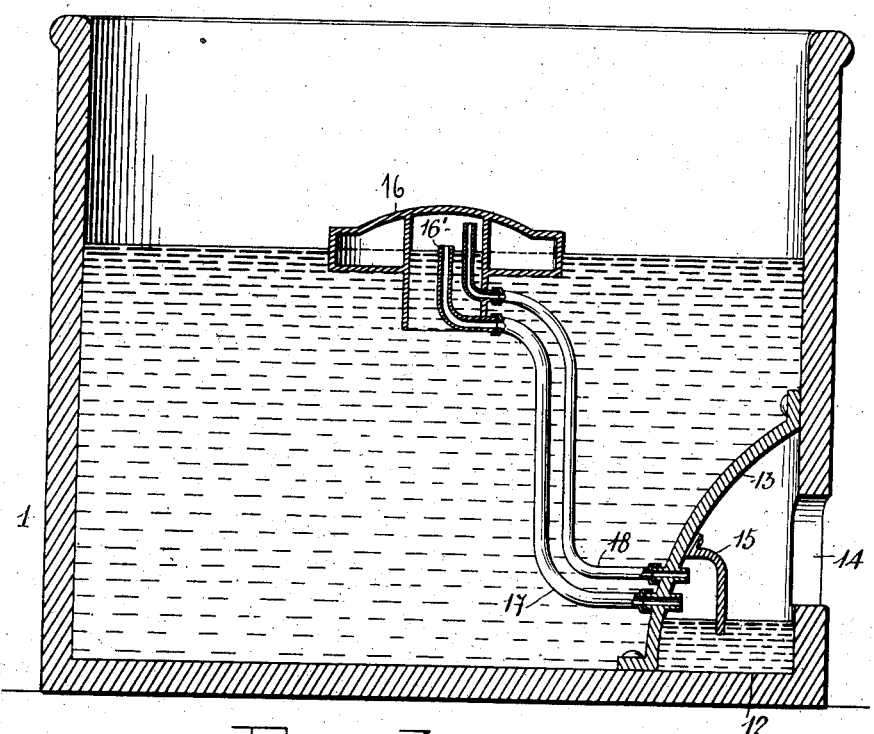
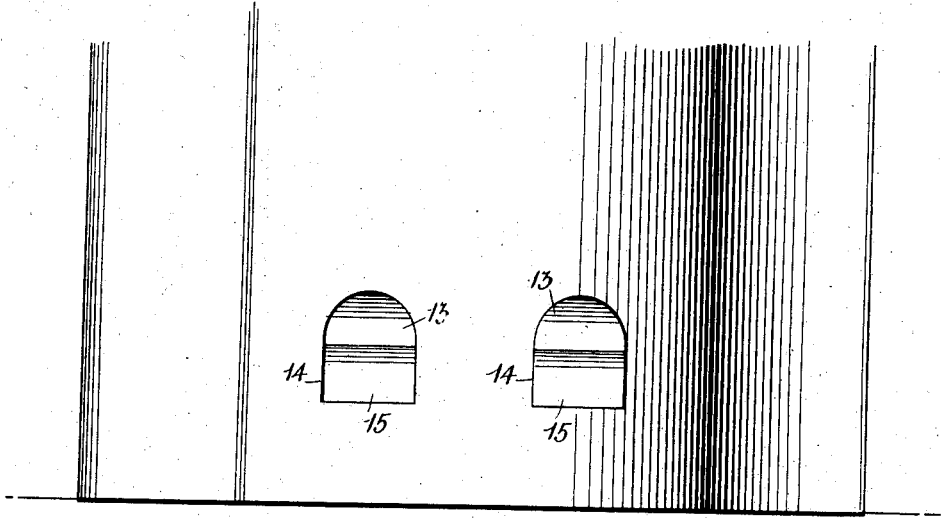
Witnesses
Inventor
John J. McCourt
by Attorneys

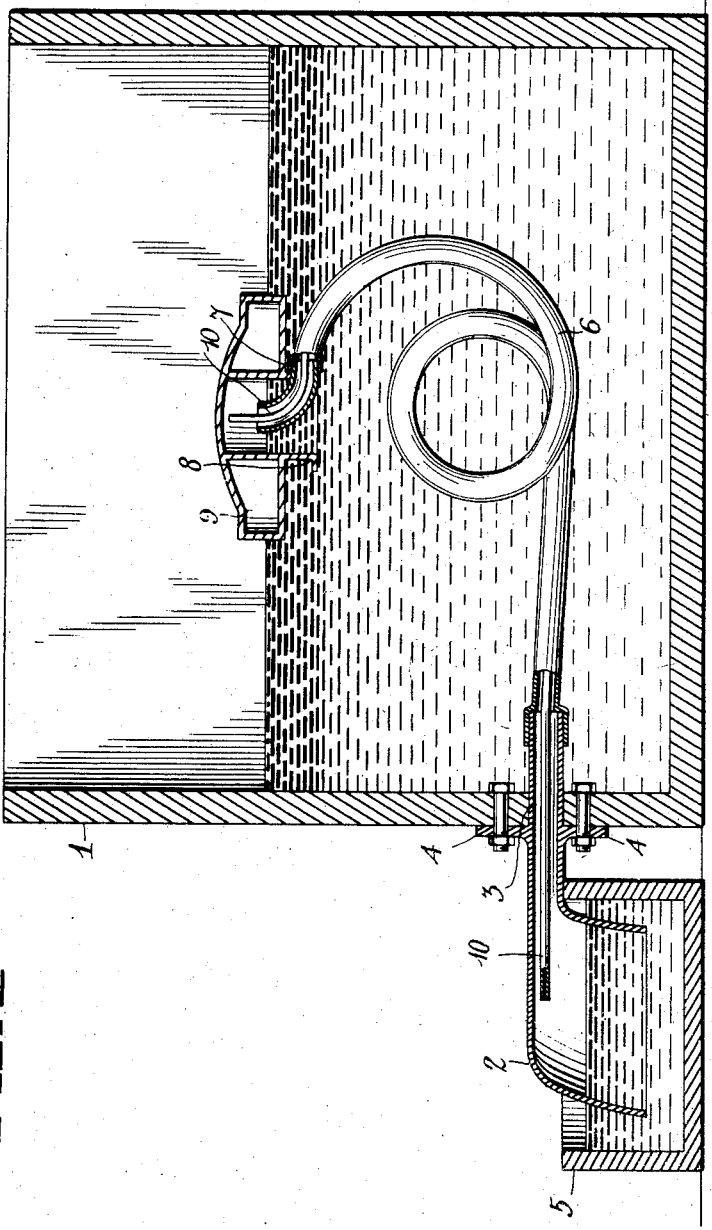

UNITED STATES PATENT OFFICE.

JOHN J. McCOURT, OF BLOOMFIELD, NEBRASKA.

STOCK-WATERER.

No. 894,037.  Specification of Letters Patent.  Patented July 21, 1908.

Application filed April 15, 1907. Serial No. 368,353.

*To all whom it may concern:*

Be it known that I, JOHN J. MCCOURT, a citizen of the United States, residing at Bloomfield, in the county of Knox and State of Nebraska, have invented certain new and useful Improvements in Stock-Waterers; and I do declare the following to be a full, clear, and exact description of the invention, such as will enable others skilled in the art to which it appertains to make and use the same.

This invention relates to improvements in stock waterers.

The object of the invention is to provide a stock waterer adapted to be automatically operated when the water in the drinking trough is removed and lowered by the animals drinking therefrom.

With the foregoing and other objects in view which will appear as the nature of the invention is better understood, the invention consists in certain novel features of construction which will be hereinafter fully described and claimed.

In the accompanying drawings which illustrate the invention:—Figure 1 is a vertical sectional view showing the application of the device to the outside of a tank; Fig. 2 is a similar view showing the device arranged on the inside of a tank; Fig. 3 is a side view of a portion of the tank shown in Fig. 2.

Referring more particularly to Fig. 1 of the drawings, 1 denotes a water receptacle which may be in the form of a tank or barrel. To one side of the tank or barrel adjacent to its lower end is secured an inverted air cup 2 which is provided with a tubular stem 3 which projects through an opening in the barrel or tank, as shown. On the stem 2 is arranged apertured fastening lugs 4 by means of which the cup is bolted to the outer side of the tank or barrel as shown. The outer open end of the cup 2 is arranged to project into a drinking trough 5, said lower end of the cup being normally submerged beneath the surface of the water in the tank as shown in the drawings. To the inner end of the stem 3 of the cup 2 is connected the lower end of a flexible supply tube 6, the upper end of which is connected to a right-angularly formed nipple 7 arranged on the lower end of a tube 8 which is mounted in a hollow float 9 which rests upon the surface of the water in the tank or barrel 1. The tube 8 projects a suitable distance below the float 9 and the upper end of the right-angularly formed nipple 7 projects upwardly into the tube to a point just above the normal level of the water in the tube 8, the lower end of said tube being open to permit the water in the tank to enter said tube. Arranged in the supply tube 6 is a smaller air conducting tube 10, the lower end of which projects through the stem 3 and opens into the upper portion of the inverted cup 2, as shown. The upper end of the tube 10 extends above the upper open end of the nipple 7 and opens into the upper portion of the tube 8, said upper portion of the tube 8 being closed by the top side of the float 9 as shown. When an animal drinks therefrom, the water will be lowered in the trough until the lower open end of the cup has been cleared which will permit air to enter said cup and to pass upwardly through the tube 10 into the space in the upper end of the tube 8.

In the operation of the device, the float 9 will be sufficiently heavy to submerge the upper end of the supply tube 6 below the surface of the water in the tank, allowing said water to flow through the tube and through the stem 3 and inverted cup 2 into the trough 5 until the water in said trough has risen therein and in the open lower end of the cup 2 sufficiently to compress the air in the upper portion of the cup and to force the same through the air tube 10 into the upper end of the tube 8 in the float 9. The pressure of the air thus entering the upper portion of the tube 8 will elevate the float and force the water in the tube 8 below the upper open end of the supply pipe 6, thus cutting off the supply of water to the trough 5. After an animal drinks enough water from the trough to lower the same below the open end of the cup 2, the compressed air in the upper end of the tube 8 will be permitted to escape through the tube 10, thus allowing the float to settle and the water in the tank to rise into the tube 8 and overflow into the open end of the supply tube 6 by which it is conducted to the trough until the same is again filled to a sufficient degree for again forcing the air in the upper end of the cup through the air tube 10 to the upper portion of the tube 8 in the float, as hereinbefore described.

In Figs. 2 and 3 of the drawing is shown a modified arrangement of the device, which in this instance is disposed inside the tank. The drinking trough 12 in the modified form of the device is arranged within and on the bottom of the tank adjacent to one side of the same and is formed by a curved metal partition 13 the upper edge of which is secured to the inner side of the side walls of the tank, while the lower edge of the partition is secured to the bottom of the tank, as shown. The partition 13 when thus arranged divides off a portion of the tank adjacent to one side from the rest of the tank and forms the trough 12. In the side of the tank and opening into the trough are formed one or more openings 14 through which the animals may insert their heads to drink. On the back wall of the trough and projecting into the same is a curved flange or hood 15 which is secured at its upper edge to the inner wall of the partition 13 and projects downwardly into the trough so that when the water therein is at its normal level the lower end of the flange will be submerged and the water rising in the compartment or cup formed by the hood will compress the air therein. Arranged in the tank is a hollow float 16 which is constructed and arranged in the same manner as the float 9, shown in Fig. 1 of the drawing, and is provided with a tube 16' which projects below the float and is connected by a flexible water supply pipe 17 and a flexible air pipe 18, with the inside of the cup or space formed by the flange or hood 15. The water pipe 17 and the air pipe 18 correspond to the pipes 6 and 10 in Fig. 1, and operate in a similar manner, as described in connection with the form of the device shown in Fig. 1.

A stock waterer constructed as herein shown and described will be simple, strong and durable in construction, efficient, reliable and strictly automatic in operation and well adapted for the purpose for which it is designed.

From the foregoing description taken in connection with the accompanying drawings, the construction and operation of the invention will be readily understood without requiring a more extended explanation.

Various changes in the form, proportion and the minor details of construction may be resorted to without departing from the spirit or sacrificing any of the advantages of the invention, as defined by the appended claims.

Having thus described my invention, what I claim as new is,—

1. A stock waterer comprising a tank, a float wholly supported by the water in said tank, a drinking trough, an inverted air compressing cup arranged in said trough, and means to connect said cup with the float whereby the water in the tank is automatically supplied to the trough when the level of the water therein has fallen, substantially as described.

2. A stock waterer comprising a tank, a float supported by the water in said tank, said float having a compressed air compartment, a drinking trough, an inverted cup having its lower open end projected into said trough and adapted to be submerged in the water therein, a water supply pipe connected with said float and cup, and an air conducting pipe to connect said cup with the compressed air compartment in the float whereby the water from the tank is automatically supplied to the trough when the level of the water therein has fallen, substantially as described.

3. A stock waterer comprising a tank, a float arranged in said tank, a tube arranged in said float to form a compressed air compartment, an upwardly-projecting nipple arranged in said tube to project upwardly into said compressed air space, a drinking trough, an inverted cup secured to the tank and having its lower open end projected into said trough and adapted to be submerged in the water therein, a stem on said cup adapted to project into the lower portion of said tank, a flexible supply pipe connecting the inner end of said stem with the nipple in the tube of said float, and an air conducting pipe arranged in said water supply tube whereby the water in said tank is adapted to be automatically supplied to the trough when the level of the water therein has fallen, substantially as described.

In testimony whereof I have hereunto set my hand in presence of two subscribing witnesses.

JOHN J. McCOURT.

Witnesses:
   F. H. CRAHAN,
   B. Y. HIGH.